(12) United States Patent
Harrison et al.

(10) Patent No.: US 9,638,836 B1
(45) Date of Patent: May 2, 2017

(54) LENSES HAVING ASTIGMATISM CORRECTING INSIDE REFLECTIVE SURFACE

(71) Applicant: Lockheed Martin Corporation, Bethesda, MD (US)

(72) Inventors: Gregory A. Harrison, Oviedo, FL (US); David A. Smith, Cary, NC (US); Carmen M. Grama, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 858 days.

(21) Appl. No.: 13/869,685

(22) Filed: Apr. 24, 2013

Related U.S. Application Data

(63) Continuation-in-part of application No. 13/211,389, filed on Aug. 17, 2011, now Pat. No. 8,781,794, and a continuation-in-part of application No. 13/211,372, filed on Aug. 17, 2011, now Pat. No. 8,625,200.

(60) Provisional application No. 61/637,340, filed on Apr. 24, 2012.

(51) Int. Cl.
| | |
|---|---|
| *G06F 17/50* | (2006.01) |
| *G02B 3/00* | (2006.01) |
| *G01B 11/27* | (2006.01) |
| *G02B 27/01* | (2006.01) |

(52) U.S. Cl.
CPC ............... *G02B 3/00* (2013.01); *G01B 11/27* (2013.01); *G02B 27/01* (2013.01)

(58) Field of Classification Search
CPC ........... G02B 3/00; G02B 27/01; G01B 11/27
USPC ............................................................ 703/1
See application file for complete search history.

(56) References Cited

U.S. PATENT DOCUMENTS

| | | | | |
|---|---|---|---|---|
| 3,969,020 | A * | 7/1976 | Lynn et al. | ................... 351/237 |
| 6,089,713 | A * | 7/2000 | Hof | ......................... B24B 9/146 |
| | | | | 351/159.47 |
| 6,142,625 | A | 11/2000 | Sawano et al. | |
| 6,533,416 | B1 * | 3/2003 | Fermigier et al. | ........ 351/159.22 |

(Continued)

OTHER PUBLICATIONS

Roger B Huxford ("Wide FOV Head Mounted Display using Hybrid Optics",Proceedings of SPIE vol. 5249, 2004,pp. 230-237).*

(Continued)

*Primary Examiner* — Thai Phan
*Assistant Examiner* — Iftekhar Khan
(74) *Attorney, Agent, or Firm* — Jetter & Associates, P.A.

(57) ABSTRACT

A lens includes a material spanning an area and providing an inside reflective three-dimensional (3D) surface. The reflective 3D surface is defined by a plurality of reflective optical elements including a first reflective optical element and at least a second reflective optical element that each include a sub-element set including a center sub-element (CS) and a plurality of neighboring sub-elements. The plurality of reflective optical elements each have their own non-overlapping optical center axis; and a cylindrically bent spherical surface. The cylindrically bent spherical surface is defined by the neighboring sub-elements in each reflective optical element being located at different 3D points so that the reflective optical elements relative to at least one neighboring reflective optical element provides different values of spherical curvature and different values of cylindrical axis orientation. Each of the plurality of reflective optical elements can provide a different optical power for correction of astigmatism.

19 Claims, 10 Drawing Sheets

(56) References Cited

U.S. PATENT DOCUMENTS

| | | | |
|---|---|---|---|
| 6,577,411 B1* | 6/2003 | David | G02B 3/10 351/159.41 |
| 6,771,423 B2* | 8/2004 | Geist | 359/630 |
| 6,923,540 B2* | 8/2005 | Ye et al. | 351/159.07 |
| 7,119,965 B1* | 10/2006 | Rolland | G02B 27/0172 345/7 |
| 7,780,290 B2 | 8/2010 | Zhao | |
| 8,384,999 B1* | 2/2013 | Crosby | G02B 27/0172 349/11 |
| 2002/0118337 A1* | 8/2002 | Perrott et al. | 351/159 |
| 2002/0163486 A1* | 11/2002 | Ronzani et al. | 345/87 |
| 2002/0164114 A1* | 11/2002 | Golub | G02B 6/266 385/18 |
| 2002/0186179 A1* | 12/2002 | Knowles | 345/8 |
| 2002/0196554 A1* | 12/2002 | Cobb | G02B 27/0172 359/633 |
| 2004/0004770 A1* | 1/2004 | Ebina | G03B 21/625 359/648 |
| 2004/0233555 A1* | 11/2004 | Matsunaga | G02B 13/06 359/859 |
| 2006/0164600 A1* | 7/2006 | Morejon | G02B 27/1033 353/31 |
| 2008/0309586 A1* | 12/2008 | Vitale | 345/8 |
| 2009/0116085 A1* | 5/2009 | Yoshimura | H04N 9/3105 359/10 |
| 2009/0228251 A1* | 9/2009 | Cakmakci et al. | 703/2 |
| 2010/0171680 A1* | 7/2010 | Lapidot et al. | 345/8 |
| 2010/0315720 A1* | 12/2010 | Filipovich | G02B 27/0172 359/631 |
| 2010/0321409 A1* | 12/2010 | Komori et al. | 345/656 |
| 2011/0175799 A1* | 7/2011 | Yamada | G02B 27/0172 345/8 |
| 2012/0200488 A1* | 8/2012 | Osterhout | G02B 27/0093 345/156 |
| 2012/0249797 A1* | 10/2012 | Haddick | G06F 1/163 348/158 |
| 2012/0307371 A1* | 12/2012 | Takamoto | G02B 13/16 359/649 |
| 2013/0141527 A1* | 6/2013 | Shimizu | G02B 5/32 348/40 |
| 2013/0278631 A1* | 10/2013 | Border et al. | 345/633 |
| 2014/0266990 A1* | 9/2014 | Makino | G02B 27/017 345/8 |

OTHER PUBLICATIONS

Darryl Meister, Abom, Aspheric Lenses: Optics and Applications, SOLA Technical Marketing, Lens Talk, vol. 26, No. 25, Jul. 1998, pp. 1-5.

Robert E. Fischer, et al., "Methods for Improving Depth Perception in HMDs", RTO HFM Workshop on "The Capability of Virtual Reality to Meet Military Requirements", Orlando, FL, Dec. 5-9, 1997.

Darryl J. Meister, et al., "Progress in the spectacle correction of presbyopia. Part 1: Design and development of progressive lenses", Clinical and Experimental Optometry, vol. 91, No. 3, May 2008, pp. 240-250.

* cited by examiner

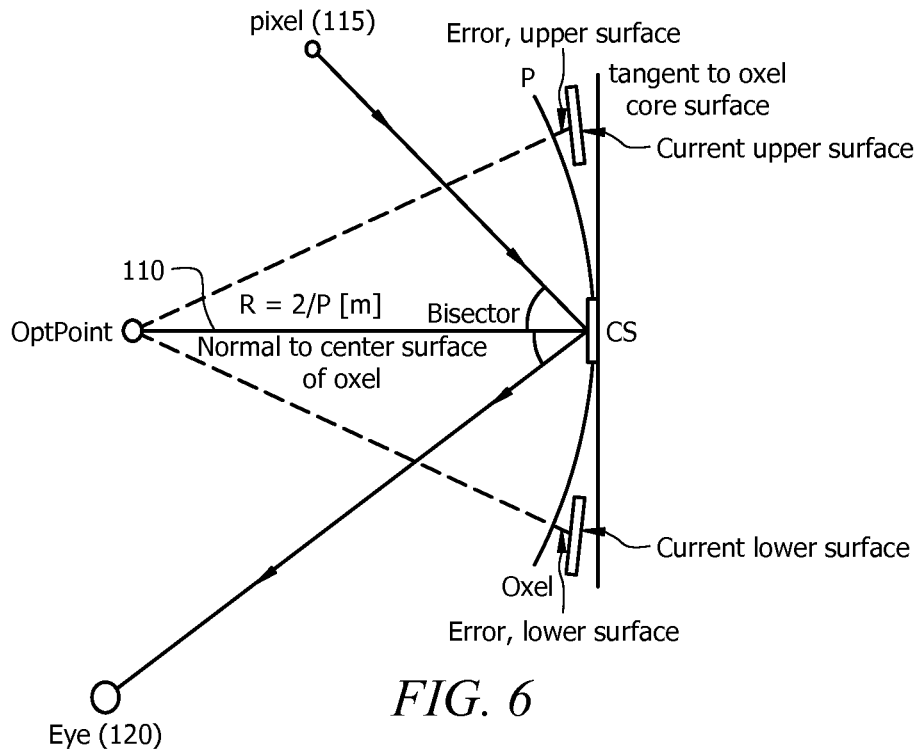
FIG. 6
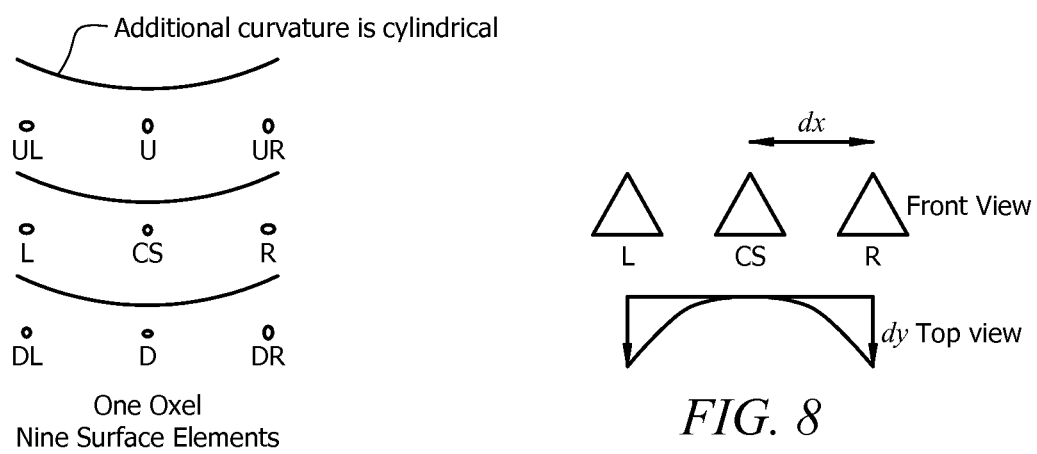
FIG. 7
FIG. 8

LENSES HAVING ASTIGMATISM CORRECTING INSIDE REFLECTIVE SURFACE

CROSS REFERENCE TO RELATED APPLICATIONS

This application claims the benefit of Provisional Application Ser. No. 61/637,340 entitled "ASTIGMATISM CORRECTION FOR WIDE ANGLE OPTICS", filed Apr. 24, 2012, which is herein incorporated by reference in its entirety, and is a continuation-in-part (CIP) of a first related patent application Ser. No. 13/211,389 entitled "Methods and Systems for Creating Free Space Reflective Optical Surfaces" and a second related patent application Ser. No. 13/211,372 entitled "Head-Mounted Display Apparatus Employing One or More Reflective Optical Surfaces".

FIELD

Disclosed embodiments relate to reflective lenses that provide different astigmatism corrections across their surface.

BACKGROUND

A curved lens will exhibit astigmatism effects when the object and the viewer are both off-center from the optical axis. When the object is a wide-angle reflective surface presenting an array of light-generating pixels to the eye, the astigmatism is particular to each location on the surface, and there will be both different amounts of astigmatism and different angles of incidence of the rays of light causing the astigmatism angle to vary across the field of view of the user.

The standard method of correcting astigmatism involves applying a cylindrical curvature to the lens such that it causes the sagittal and the tangential light fans to come to a real image focus at the same point in space. The cylindrical curvature is uniformly applied to the entire lens area, where the cylindrical curvature can be defined by an equation.

SUMMARY

Disclosed embodiments include methods and systems for creating (i.e., designing and/or fabricating) astigmatism-corrected free space lenses having inside reflective three-dimensional (3D) surfaces defined by a plurality of reflective optical elements each having their own non-overlapping optical center axis which thus function as independent optical systems. The astigmatism adjustment (cylindrical curvature) varies between the respective reflective optical elements across the area of the reflective 3D surface.

The magnitude of the cylindrical curvature for each of the reflective optical elements is based on their location on the 3D surface and is designed to counteract oblique astigmatism arising from off-center expected pixel (light generator) for that reflective optical element and a predetermined reference location (e.g., the expected center of the user's eye (fovea) for head mounted display (HMD) apparatus applications). The variation of the astigmatism adjustment is described herein designed using an array of "oxels", which are small optical systems (e.g., each typically on the order of 50 μm to 1 mm in each in-plane direction, such as in one particular embodiment there are 500 oxels across a 4 inch surface, for 0.2 mm×0.2 mm oxels) that express 3D surface curvature at surface locations. A large number of oxels (by way of non-limiting example, thousands) are part of a larger optical system that upon data smoothing and fabrication become reflective optical elements that collectively provide a disclosed reflective 3D surface.

In the design, each oxel can be treated on an internal surface-by-surface basis to determine their own corrections along predicted astigmatism axes, as noted above based on the angle between the associated emitting pixel (or pixels) from a display device off the location of the oxel to the center of the user's eye, so that being placed in different locations the reflective optical elements upon being fabricated generally each provide different amounts of cylindrical correction (sagittal- and tangential-direction cylindrical curvature) to focus the sagittal beams and the tangential beams to the same point (where the eye of a user will be in the case of application to a HMD apparatus). The plurality of reflective optical elements also generally provide different spherical curvature. The surface curvature of disclosed reflective 3D surface slowly varies reflective optical element to reflective optical element as the distance to the pixel from the particular reflective optical element surface and the angle to the pixel from the surface normal will vary slowly.

Regarding the oxel-based design method, the plurality of oxels on the optical surface can be expressible as a point cloud which represents the reflective 3D surface, where the point cloud is convertible into tangible disclosed astigmatism corrected 3D surfaces for real-world applications using a suitable fabrication method (e.g., 3D printing). A point cloud is a set of vertices in a three-dimensional coordinate system, defined by 3D-coordinates, such as x, y, and z coordinates for example, which represent of the external surface in 3D of an object.

Disclosed embodiments allow the free-space wide area lenses (e.g., at least 150° degrees, such as 200° field of view) to focus more correctly, counteracting defocus effects of astigmatism, by changing the optical properties across the full area of the reflective 3D surface. Disclosed embodiments also provide objective and direct methods to apply astigmatism correction as opposed to the conventional trial-and error method.

There are generally no adjustments needed in the design since each oxel forms its own optical system and each optical system is bent to adjust for astigmatism that is known in advance will be present in that system (based on the angle range between the associated emitting pixel(s) from a display device off the reflective optical surfaces to the eye of the user), in a desired amount and in a desired direction. However, since the oxels are being used in a system that has other interacting (neighboring) oxels in the design, the pure correction based upon the astigmatism appearing in an example spherical mirror/lens may be modified in the design through various processes including the design process of reducing residual error after the optical surface has been adapted to minimize the overall error for all oxels, reducing errors in the splining, or ensuring a sufficient number of oxels. The corrections during the design may be performed through the iterative, test, adjust and repeat, with the adjust being a global gain adjustment for the amount of cylindrical curvature needed to reduce the astigmatic distance down to zero, and in another embodiment a global power offset value to adjust the focus of the light waves of the virtual image entering the eye of the user so that it concentrates on the fovea.

Errors due to inappropriate splining may be detected through testing different splining parameters to determine those parameters that produce the best optical image at the fovea. Errors due to the use of an insufficient number of oxels in the design may be detected by varying the number of oxels that are used, and running the resulting design through an optical ray-tracing simulation, similar to the investigation of the splining parameter settings.

Disclosed embodiments include lenses that include a material spanning an area that provides an inside reflective 3D surface. The reflective 3D surface is defined by a plurality of reflective optical elements including a first reflective optical element and at least a second reflective optical element that each include a sub-element set including a center sub-element (CS) and a plurality of neighboring sub-elements. The plurality of reflective optical elements each have their own non-overlapping optical center axis, and a cylindrically bent spherical surface. The cylindrically bent spherical surface is defined by the neighboring sub-elements in each reflective optical element being located at different 3D points so that the reflective optical elements relative to at least one neighboring reflective optical element provides different values of spherical curvature and different values of cylindrical axis orientation. Each of the plurality of reflective optical elements can provide a different optical power for correction of astigmatism.

BRIEF DESCRIPTION OF THE DRAWINGS

FIG. 6 shows how surface errors are detected in the current upper and current lower sub-surfaces with respect to the optical system expected for use with and built around a particular CS. After these errors are detected, the next oxel can be processed, and so on to complete the design.

FIG. 7 shows gross astigmatism correction on a given oxel induces a cylindrical correction assuming that the tangential plane is vertical through the D, CS, and U sub-surfaces.

FIG. 8 depicts edge surface bend inwards or outwards cylindrically to minimize the local astigmatic distance.

DETAILED DESCRIPTION

Figure 1:
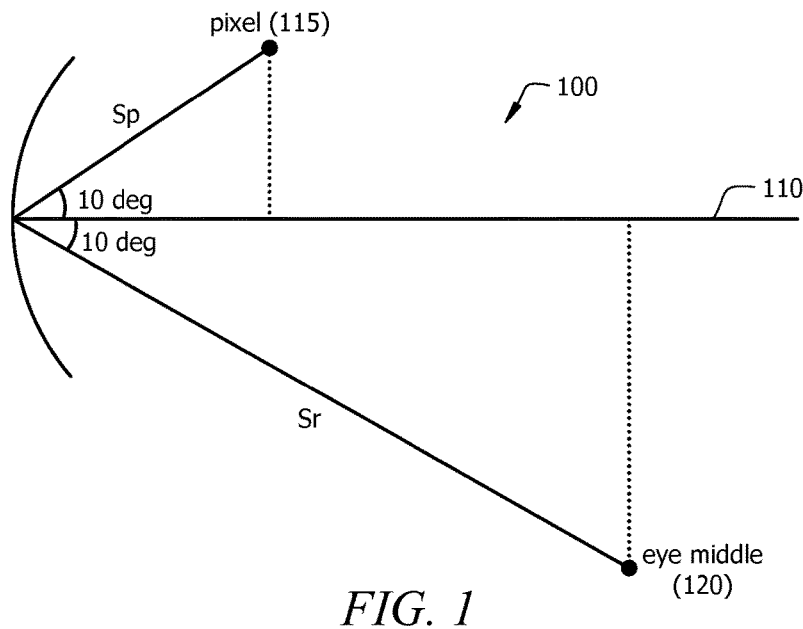
FIG. 1 provides an example astigmatism survey schematic case description.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments recognize that the standard astigmatism correction method for lenses which generates a single astigmatism correction across the entire area of the lens cannot be used for "free-space lenses" without a significant performance penalty, because the wide field of view and resulting oblique angle changes causes different optical effects to be created at each location across the lens surface. This gives rise to variation of astigmatism properties across the lens surface. As disclosed herein, the astigmatism is corrected in the design by dividing the lens area into a plurality of oxels, being at least 2 in each in-plane direction, and generally being at least 100 oxels in each in-plane direction, and then cylindrically bending each oxel (which upon fabrication each may become a reflective optical element) on the lens surface in the tangential and sagittal directions (along the tangential and sagittal axes). The cylindrical bending is configured to focus the location of the tangential and sagittal waves from pixel light on the respective oxel so that the waves (light) reflected off comes to focus on the fovea of the user, thus counteracting oblique astigmatism arising from off-center expected display pixel location for each oxel and the expected fovea of the eye. Each of the plurality of reflective optical elements can provide a different optical power for correction of astigmatism. As known in the art of optics, optical power for correction of astigmatism is a function of cylindrical optical power and cylindrical axis orientation.

As noted above, corrections (or adaptations) during the oxel design process may be iteratively determined, including a global gain adjustment for the amount of cylindrical curvature needed to reduce the astigmatic distance down to zero, and in another embodiment a global power offset value to adjust the focus of the light waves of the virtual image from a pixel display entering the eye of the user so that it concentrates on the fovea. The corrections are thus calculated and then applied at once to the whole surface, with the resulting error over the whole surface determined, and if the error is not low enough then the error correction process is repeated. The concept of the error being low enough can be specified by stopping the process when the error starts to increase, indicating that the error has reached the lowest point and has started to oscillate at an asymptote.

The cylindrical curvature gain is not repetitively adjusted during the adaptation automated process, but may be changed as an input parameter and the process re-run. The adjustments are made to adapt to provide the selected focus of the light waves of the virtual image entering the eye of the user so that it concentrates on the fovea.

Disclosed reflective 3D surfaces are not created in their design by polynomials expressing the z-axis height referenced to an x-y plane as is done in free-form lenses. Instead, disclosed reflective 3D surfaces can be created in their design with oxels each at any location in 3D space, and oriented in any direction, and can even wrap around past 180 degrees, which would be difficult to represent as a height above an x-y plane. Each of the small surface areas referred to herein as oxels for the design when fabricated form a single optical system, and these optical systems are smoothed together over the whole intended optical surface after being adjusted to obtain an astigmatism correction that provides a low overall error for the free space reflective 3D surface.

Disclosed embodiments include astigmatism correction techniques that vary the astigmatism correction across the area of the reflective 3D surfaces which generally span a wide angle, such as at least 200°. Since wide field-of-view (FOV) close-to-the-eye optics can be designed such that the sagittal plane is not coincidentally horizontal with the horizontal plane of the oxel row on the wide FOV reflector, nor is the tangential plane necessarily vertical with respect to the vertical axis of the wide-FOV glasses, nor even is the oxel layout actually horizontal and vertical after many epochs of adaptation, each oxel can be individually treated on an internal surface-by-surface basis for the corrections along physically determined astigmatism axes. The axes are not assumed to be horizontal and vertical, but instead the tangential axis is determined by the plane containing the eye of the user, the center surface of the oxel and the associated pixel center. The sagittal plane is 90 degrees to that plane.

With disclosed oxel-based design methods there is no overall single equation that defines the shape of the reflective 3D surface, instead the reflective 3D surface is created from a large number (by way of non-limiting example, thousands) of oxels that can each have individualized astigmatism corrections which are smoothed together to form the resulting overall surface shape. The astigmatism correction is adapted to function like the free-space surface generation system such that at the oxel level, the astigmatism correction is embedded in the goal state that is used to obtain the correction errors for each oxel.

Each oxel includes a sub-element set including a center (core) sub-element (CS), and surrounding neighboring sub-elements. Each neighboring sub-element is the CS of another oxel. In this way, the adjustments and adaptations affect the surrounding surface smoothly. The sub-elements are adjusted on an oxel-by-oxel basis, to move their position to minimize the distance between their position and a nearby position on a theoretical 3D surface in space that satisfies the optical requirements for that oxel. The astigmatism correction can be updated each time the sub-surface elements in the oxel are adjusted in the design. For each of the plurality of oxels, a calculated adaptation can be used for the non-core sub-surfaces (points) to make them lie on the 3D surface that defines the desired optical system for that oxel.

This adaptation for each sub-surface element moves along a 3D adaptation vector from where the neighboring sub-surface is to where it should be for that oxel. The 3D adaptation vector is determined for each sub-surface element. Since the oxels are interlinked, there are other adaptations that apply to each oxel point. For an example, in a nine sub-element oxel, there will generally be eight separate adaptation vectors that stem from the attempt to satisfy the optical system (reflecting optical requirements at that location), for each of the neighboring oxels by each shared sub-surface element. All of these 3D adaptations are generally added together to determine an adaptation that averages the desired motion to satisfy all the optical systems that use this sub-surface point.

A learning rate can then be applied, for instance $\frac{1}{1000}$, in order to move the surface a small amount in the right direction. The small amount of motion, due to the low learning rate, is used to help control the speed of adaptation and to even out and smooth the resulting surface calculation, avoiding oscillation in the surface estimation, and resulting in an monotonically-decreasing error as all the surface is slowly adapted into the lowest error surface. In an example design using a nine sub-surface oxel (see FIG. 5 described below), in the center area of an overall optical surface (not the edge), a single sub-surface element will belong to nine different oxels and will get adjustments from eight of the nine oxels it belongs to. The ninth oxel of the sub-surface element belongs to is the CS sub-surface which need not be adjusted.

The sub-surface elements in the design may be adjusted using a suitable algorithm run on a computing device a very large number (by way of non-limiting example, millions) of times before the final reflective 3D surface contour is calculated. At each adjustment, there can be concomitant adjustment for astigmatism intrinsically linked into the adjustments. The combined cylindrical and spheroidal specifications for a given oxel are calculated at each iteration and are used to make each sub-surface element move a slight amount in the direction calculated for that particular oxel. The oxel next to that particular oxel will also process and may apply adaptations to the some of the same shared sub-surface elements in order to push that sub-surface element in the direction needed to satisfy its own cylindrical and spheroidal requirements for astigmatism correction.

Figure 5:
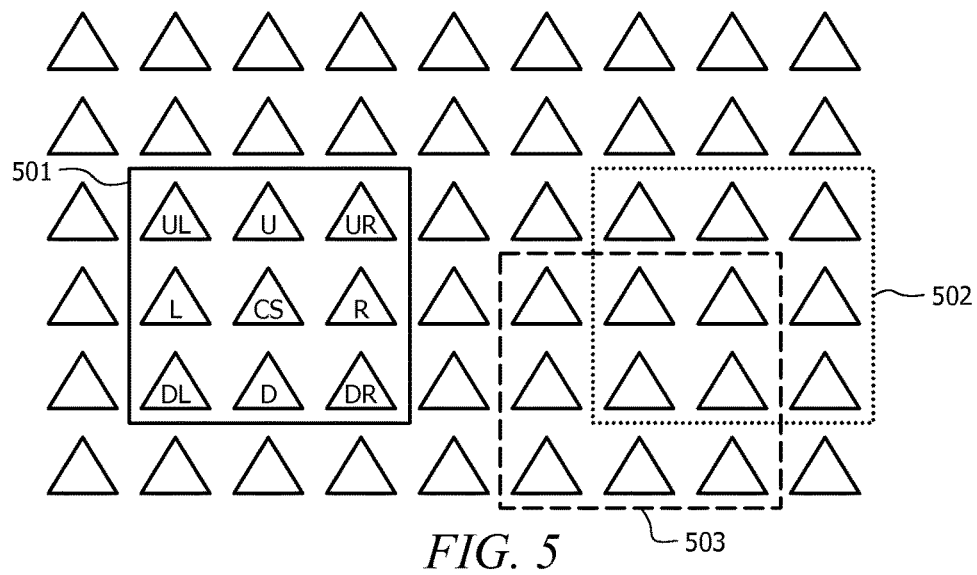
FIG. 5 shows how overlapping oxels allow one oxel to affect the oxels around it. The nomenclature used for oxel sub-surface naming is shown as CS=core sub-surface, and for the other "neighboring" sub-surfaces U=Up, UR=Up Right, R=Right, DR=Down Right, D=Down, DL=Down Left, L=Left, and UL=Upper Left.

This is illustrated in FIG. 5, where the oxels shown include oxels 501, 502 and 503 which each all include a sub-element set of nine sub-elements including a CS element and 8 neighboring sub-elements (UL, U, UR, L, CS, R, DL, D, DR). The first oxel 502 has a sub-element set including neighboring sub-elements surfaces that are adapted to satisfy the optical system needed for the first oxel 502, in the case the neighboring sub-elements are not on the desired 3D optical surface for the first oxel 502. The second oxel 503 as shown also uses some of the same neighboring sub-elements as oxel 502 and thus shares some neighboring sub-elements, but there is a different optical surface desired due to the geometrical positioning of the second oxel 503 and the associated pixel(s) it reflects, and hence it will attempt to move the shared neighboring sub-elements by a slightly different amount and in a slightly different direction than the adaptation determined for the first oxel 502. These two adaptations, and the other adaptations due to the other surrounding oxels are added together and averaged for each shared sub-surface to determine how much and in what direction to move it. It is then only moved a fraction of the adaptation distance, as determined by the learning rate, in order to slowly adapt the entire surface together. This adaptation is performed for all the oxels and sub-element surfaces at once, and then the changes are applied all at once and the process repeated. The surface then ideally converges to a low error solution, as it has been seen to normally do, with the appropriate settings, such as having a sufficient number of oxels, and a sufficiently low learning rate, with examples of such provided herein.

This design technique can use the expected astigmatism correction to calculate what effect the correction will have on the shape of the sphere that defines the goal state of the oxel. This aspect is clarified below, particularly in relating to FIGS. 18 and 19 described below, which disclose each oxel summing its individual cylindricity correction with its spheroidality correction to determine the desired shape of the surface that the oxel would have if it was the only oxel in the system and was representative of the entire reflective 3D surface. Since there are a plurality of oxels, each sub-surface is only a goal that it tries to adapt to through contributing small changes to be averaged in with the changes from the other oxels that also want to drive the same sub-surfaces.

The astigmatism may be corrected in an initial "gross" manner or in another embodiment on a "more tailored" manner. The gross manner assumes one setting and angle for both the sagittal and the tangential astigmatism across the whole surface of the reflective optical surface and that the vertical axis of the line of sub-surface elements on the reflective optical surface lies on the astigmatic tangential plane, and thus the horizontal line of sub-surface elements lies along the sagittal plane. This correction takes place on an oxel-by-oxel basis with the net result of inducing a cylindrically curved change to the surface of the reflective optical surface, which can be used iteratively as described above so that it does not introduce any more change than is needed.

The more tailored method includes determining the angle of the tangential plane, and the angle of the sagittal plane as well, with respect to the center CS of the oxel. Then the actual location of each of the neighboring sub-surfaces in the oxel is used to calculate the affect that the angled cylindrical bend will have on that sub-surface. The amount of astigmatism correction is determined by the angle that the associated pixel(s) makes with the eye (see FIG. 6 described below) and the basic radius-of-curvature of the oxel. These two values are tabulated with respect to their performance with a spherical mirror-based system which may then be interpolated into to calculate the amount of cylindrical curvature including sagittal and tangential diopter correction (bending) to be applied to each oxel on an oxel-by-oxel basis.

Figure 2:
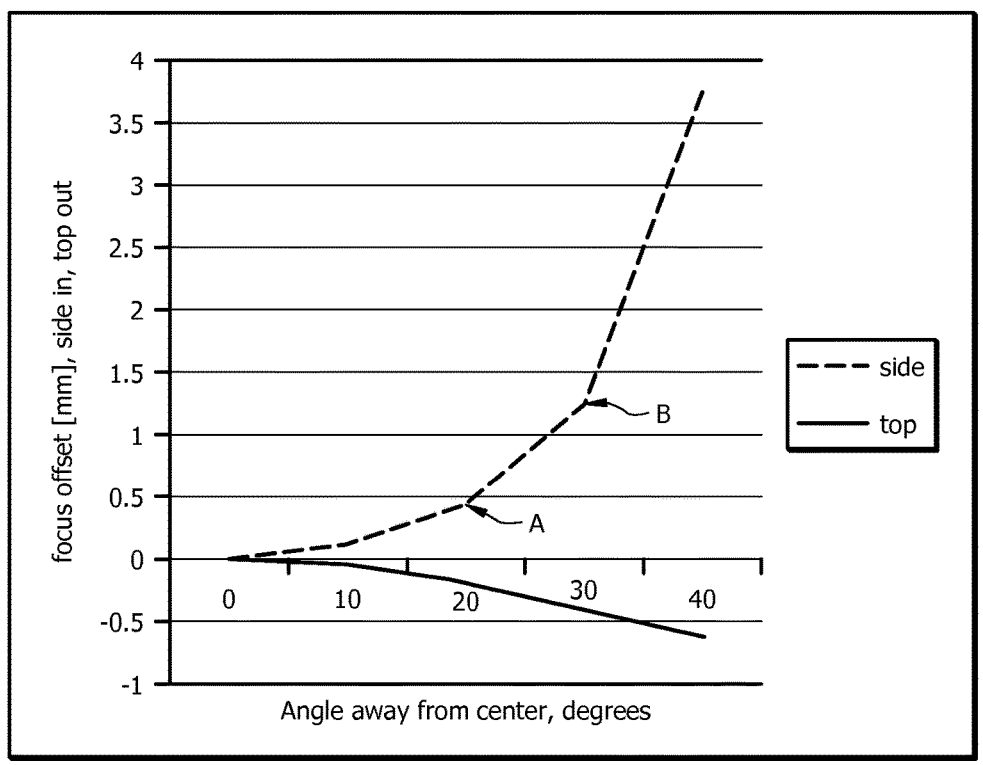
FIG. 2 shows results for an astigmatism survey for one particular radius of curvature for a reflective 3D surface. By inspection of the astigmatism curves the astigmatic distance is seen to be increasing as the angle away from the optical centerline increases.

An example method of accomplishing an astigmatism survey and example results are shown for a given selected radius of curvature for a reflective surface (by way of non-limiting example, a lens) in FIGS. 1 and 2. FIG. 1 shows a schematic view of an optical system 100, describing the angles away from the centerline 110 of the optical system with respect to the light emitting object with a pixel 115 shown and the middle of the eye (light receiver, e.g., fovea) 120, 10 degrees as shown. This would be repeated for different angles, and then repeated again for different curved surfaces having different radius of curvature settings. This design process can be performed by a computing device running an optical simulation algorithm. The results may be tabulated as shown in FIG. 2 for both the tangential focus location and sagittal focus location, shown as a graph of astigmatism as a function of the angle away from the center line 110, where the "top" represents the sagittal rays (tangential focal plane) and the "side" represents the tangential rays (sagittal focal plane). There can be a single two-dimensional table, such as in the case of FIG. 2, for each of the different radius of curvature (or equivalently focal length of the lens since the radius of curvature is 2 times the focal length, R=2f) simulations performed.

It is expected that the radius of curvatures and the offset angles chosen will represent a distribution across the expected operating range, and then the two-dimensional table will be interpolated into using a formula, such as a four-point bivariate interpolation shown below:

$$f(x_0+ph, y_0+qk) = (1-p)(1-q)f_{0,0} + p(1-q)f_{1,0} + q(1-p)f_{0,1} + pqf_{1,1}$$

where h and k are the numerical representations of the physical offsets in angle or radius of curvature from one table point to another, such as between $x_0$ and $x_1$; q and p are the amount (in the range [0 . . . 1]) that the interpolation between the inputs should progress into the space between known data points $f_{0,0}$, $f_{0,1}$, $f_{1,0}$, and $f_{1,1}$ for tangential and sagittal data, one set for each.

Figure 3:
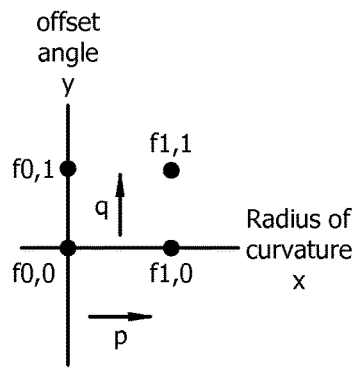
FIG. 3 is an interpolation diagram for an example astigmatism amount empirical calculation.

FIG. 3 diagrams a disclosed interpolation concept, and the basic interpolation form and an interpolation equation from the *Handbook of Mathematical Functions* from M. Abramowitz and I. A. Stegun. Another interpolation method to record this difference (physical offsets in angle or radius of curvature) is to model it with a second order (or higher) equation curve fit for each recorded focal length. Curve parameters can then be interpolated between lens powers instead of actual data results to obtain angles of a tangential plane and sagittal plane with respect to a CS surface and diopter corrections for each of the plurality of oxels.

As can be seen in FIG. 2, the astigmatism distance (shown as a focus offset) is a function of oblique angle away from the centerline 110 of the lens axis. This example data was calculated for a single lens radius of curvature. The side (tangential rays; sagittal focal plane) can be seen to increase rather steeply as compared to the top (sagittal rays; tangential focal plane). One can see the individual data points as vertices in the curve. There is a different set of curves for a different focal length lens (or different radius of curvature). In a final solution, these curves will generally be correct for any spherical mirror at that focal length.

As described above, one method to determine the astigmatism correction to a spherical surface is to determine the focus offset, and then determine the astigmatism correction using vertex points, such as A or B shown in FIG. 2 on the curve, as entries in a multidimensional table, and then interpolate to find points between A and B. It is noted that A and B were actual measured points, and the interpolation is intended to be able to predict the points in between the interpolated points.

Another method to determine the value of points in-between points on a curve, such as points A and B shown in FIG. 2, is to fit an equation to match astigmatism curves, and not have to maintain the 3-D tabular data and utilize memory, where all the data that is needed is to maintain the parameters for the equations, which should utilize less memory. For example, the equations for these curves in FIG. 2 would be:

For the curve marked "side" (or tangential offset), the offset, y, versus the angle, x, is $$y=0.0364x^4-0.313x^3+1.0649x^2-1.4339x+0.6456$$

The second line, the "top" view (or sagittal offset), y, with respect to angle, x, is $$y=0.0035x^4-0.0324x^3+0.0586x^2-0.0516x+0.0218$$

These forms of representation of the astigmatism use about the same amount of memory to hold the four polynomial factors as does the five points of data itself, but will provide a much better curve fit than the interpolation method.

Disclosed astigmatism correction for designing reflective optical surfaces can be implemented by bending the surface of the optical junction between two indexes of refraction, such as what happens with optical glass, or in the lens in a pair of eyeglasses. The junction between two indexes of refraction could be the junction between air and glass, or more particularly by bending the reflective optical surface at the oxel level. Thus the curvature and optical prescription can change across the area of optical system.

Figure 4:
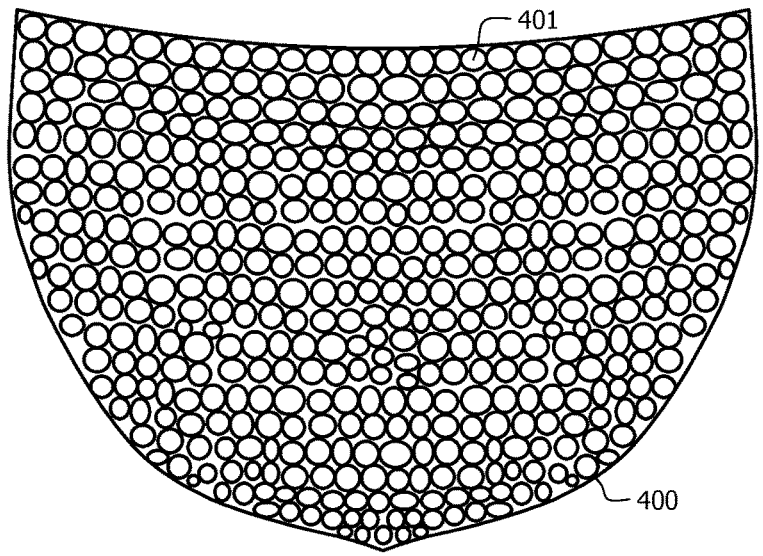
FIG. 4 shows oxels spread across the area of an example reflective 3D surface such as a mirror or lens surface. There would generally be many more oxels (e.g., in the thousands) than the number shown in FIG. 4.

Example oxels 401 are shown in FIG. 4 each having different localized optical systems (different spherical and cylindrical corrections) spread across the reflective 3D surface 400, such as a reflecting mirror or reflecting concave lens. Each oxel 401 presents a solution for a single optical system, and the individual oxels are smoothed together, such as smoothing using Non-Uniform Rational B-Splines (NURBS) to create a smoothly changing surface across the entire reflective 3D surface.

In FIG. 6, the optical system shown is established for each oxel, and each oxel has its own CS, as shown. The centerline 110 of the optical system is shown from a point shown in FIG. 6 as the Optpoint providing a bisector to CS (normal to the center surface of CS). Each oxel is made to reflect light from a pixel 115 (a single pixel or set of pixels in an area), or other location on a light emitting object, into a light receiver such as the fovea of the eye 120 of a user. The oxels are each angled to obtain the proper angle to reflect the light emitted from that pixel 115, so that the light enters the eye 120.

As seen in FIG. 7, the respective sub-elements (UL, U, UR, L, CS, R, DL, D, DR) of the oxel can be viewed as having a horizontal row attribute and a vertical column attribute. In some embodiments, the pixel (light emitter) is generally situated above the eye, and thus the tangential plane is essentially vertical. With this assumption an initial ("gross") overall astigmatism correction term can be applied identically to all the sub-elements of the oxel, as shown in FIG. 7.

Since the curvature correction in the design is applied at an oxel level, as shown in FIG. 7, and is re-applied at each oxel, the cylindrical corrective curvature applied can be a fixed amount, and added to the expected spherical surface that the oxel is trying to achieve by reducing error. As the error is reduced, the oxel surface represented by the 3D respective locations of the sub-element defined surface points in the oxel (UL, U, UR, L, CS, R, DL, D, DR) can be adjusted to be situated on the expected optical surface with the desired astigmatism correction. This adaptation may occur any number of times.

The adjustment to each neighboring sub-element surface (UL, U, UR, L, CS, R, DL, D, DR) in the oxel being corrected can be determined by the relation of that sub-element surface element to the CS of that oxel. For the gross adjustment case, there is either horizontal or vertical adjustment or both, but not a direct diagonal adjustment. When a horizontal cylindrical adjustment is made to the sub-elements in the oxel of FIG. 7, the same amount of cylindrical adjustment is made to the UR, R, and DR or to the UL, L, and DL surface locations, since a vertical cylinder bend is being applied to the oxel. The actual amount of motion, (i.e. moving points around in the point cloud that defines the surface), depends on the amount of astigmatism correction (the diopter) and the actual location of the sub-surface element with respect to CS. In the case of FIG. 7, it may be envisioned that the cylindrical bend is coming out of the page on the left and right edges of the oxel.

Determining the amount of cylindrical curvature to apply to the oxel edges (neighboring sub-element surfaces) can begin by determining the diopter amount of correction to apply. Setting C as the correction, and using the definition of diopter as 1/distance_in_meters, allows a diopter setting such as C=1.32 [dpt], where dpt is an abbreviation for diopter.

To calculate the adjustment, FIG. 8 explains the concept in two dimensions (x,y), with the final adjustment taking place in 3D. FIG. 8 depicts three horizontal surfaces in an oxel, in this case the L, CS, and R sub-element defined surfaces. Note that these sub-surfaces are shown as a triangle, giving them planar characteristics, but they can also be realized as just a 3D point in space, which point can be connected to the nearby 3D points, such as through NURBS draping to obtain a smooth continuous 3D surface. This example illustrates horizontal correction, as if the sub-surfaces at the edges (L and R) were bent cylindrically inward or outward. This adjustment also applies to UL and UR, and DL and DR, but U and R remain unchanged due to the cylindrical adjustment since in this case a vertical cylinder is used as the basis of sagittal wave correction.

Looking down on the set of sub-surface elements from FIG. 8 shows that a correction is desired by the amount dy, as seen in the lower section of FIG. 8. The differential dx can be measured on the surface as the existing horizontal displacement between the CS, and the edge L or R, or UL-U, UR-U, DL-D, or DR-D. Once dx is measured, dy can be calculated for that surface by determining the offset a cylinder of the proper radius would have at that location, and creating an offset based upon that.

The specification for correction in astigmatism is $C_a$[dpt] and a cylindrical lens has a diopter rating equal to the power of the cylindrical lens, which is 1/fl, where fl is the focal length. As noted above, the focal point for a cylindrical mirror (reflector) is ½ the length of the radius of curvature $R_c$ of the cylinder, and $$R_c = 2\,fl$$
$$= \frac{2}{C_a}$$

Thus to provide a 0.1 diopter astigmatism change, the radius of curvature of the cylinder is:

$$R_c = \frac{2}{C_a}$$
$$= \frac{2}{0.1[dpt]}$$
$$= \frac{2}{0.1[m^{-1}]}$$
$$= 20\ [m]$$

Figures 9, 10, 11:
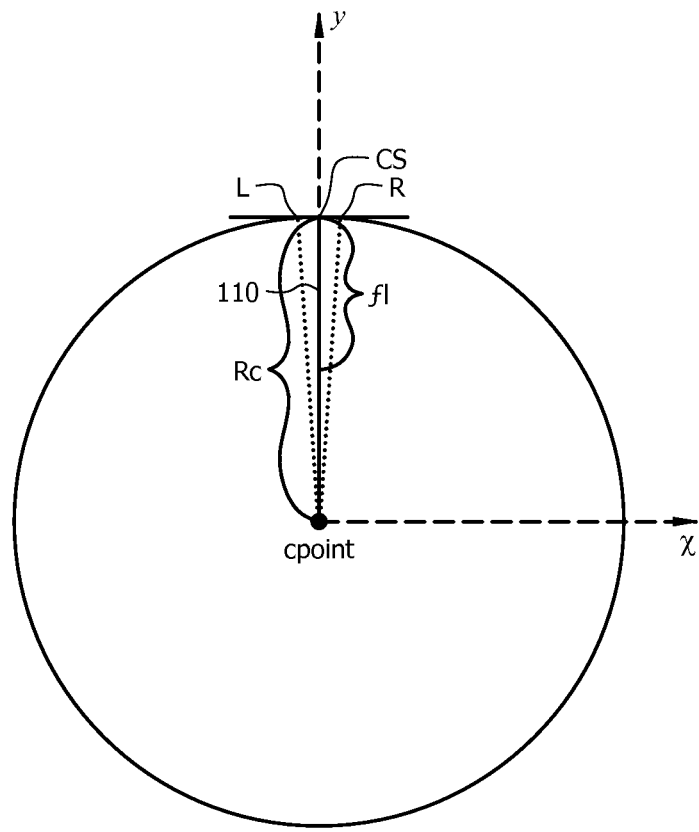
FIG. 9 depicts the radius of curvature for the astigmatism correction introduced to an oxel resulting in a central point from which to describe the cylinder that extends into and out of the page. This is a top view of the CS in relation to the side of the cylinder.
FIG. 10 shows oxel surfaces adaptation for horizontal ray fan adjustment.
FIG. 11 shows oxel surfaces adaptation for vertical ray fan adjustment.

The CS of each oxel has its own non-overlapping optical center axis/surface normal associated with it and it points inward toward the center of curvature. The radius of curvature $R_c$ shown as 110 in, FIG. 9 is aligned on the surface normal of CS. Tracing this line from the CS through the distance $R_c$ determines the point on the central radial axis of the astigmatism correction cylinder, shown as the point cpoint. Note the x and y axis on FIG. 9. Using the equation for a circle with radius r:

$$x^2+y^2=r^2$$

and knowing x and r allows calculating the y offset for this surface, with the sign of the square root determined by the sign of the dioptric change requested, such that if C is negative, y is positive to point the cylinder outwards, diverging the light waves; and if C is positive y is negative to orient the cylinder inwards to converge the light waves to focus closer to the surface.

$$y=+\sqrt{r^2-x^2};\ C<0$$
$$=-\sqrt{r^2-x^2};\ 0<C$$

This new value for y can be added to the current expected value determined for this surface based upon what the desired spherical lens shape for this surface is. A new value for y is calculated for each affected surface element for the oxel. Also, a new value for cpoint is calculated when moving to different oxel CS surfaces as the calculation proceeds. The affected sub-surface elements for horizontal gross sagittal astigmatism correction are shown in FIG. 10 as "H", and the affected sub-surface elements for vertical gross tangential astigmatism correction are shown as "V" in FIG. 11. In both cases the ray fans associate with the direction, horizontal (FIG. 10) or vertical (FIG. 11), which are adjusted to focus closer or further away. The same diopter-based adjustment can be applied to each indicated sub-surface, although the magnitude of each adjustment may change based upon how far it is from the horizontal or vertical center line of the oxel.

Figure 12:
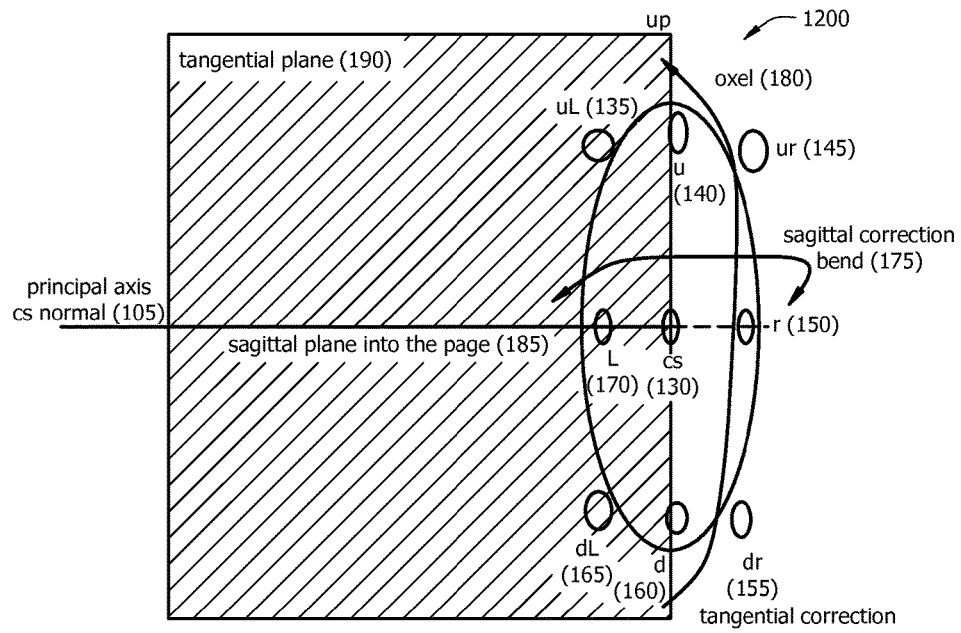
FIG. 12 shows "gross" astigmatism correction that assumes that the tangential axis aligns with the vertical layout of columns of sub-surface elements of the oxels in the reflective 3D surface.

A more detailed description of an example initial astigmatism correction is shown in FIG. 12, where the oxel alignment system 1200 shows an oxel 180 comprising nine (9) sub-surface elements including CS 130, and its neighboring sub-elements 135, 140, 145, 150, 155, 160, 165, and 170. CS 130 has an associated principal axis CS normal 105. The tangential plane 190 is aligned with the vertical axis in the surface, represented as the axis containing sub-surface elements including CS 130, and neighboring sub-elements 140 and 160, and being the plane, or planes perpendicular to it, into which the tangential ray fan focus corrections are applied by adjusting the locations of neighboring sub-surfaces 135, 140, 145, 155, 160, and 165 in a cylindrical manner, with the cylinder laying horizontally with reference to this image. The sagittal plane 185 is perpendicular to the plane of the image, and is aligned with the horizontal axis in the surface, represented as the axis containing sub-surface elements CS 130, and neighboring sub-elements 150 and 170, and being the plane, or planes perpendicular to it, into which the sagittal ray fan focus corrections are applied by adjusting the locations of neighboring sub-surfaces 145, 150, 155, 135, 170, and 165 in a cylindrical manner, with the cylinder laying vertically with reference to this image. The orientations for a tangential correction bend 125 and sagittal correction bend 175 are also depicted in FIG. 12.

As described above, a more accurate method of correcting astigmatism in free-space wide field of view reflective 3D surfaces designed using the oxel-based technique is to correct each oxel separately based upon the optical system set up and maintained through adaptation for that oxel. Oxels are distributed through 3D space to form a 3D surface, and there is no one location for all oxels, and the components in each oxel can move with respect to one another causing different locations of the surrounding surfaces with respect to the CS. The CS is used as the core of the oxel astigmatism correction, as well as the oxel focus corrections.

Figure 13:
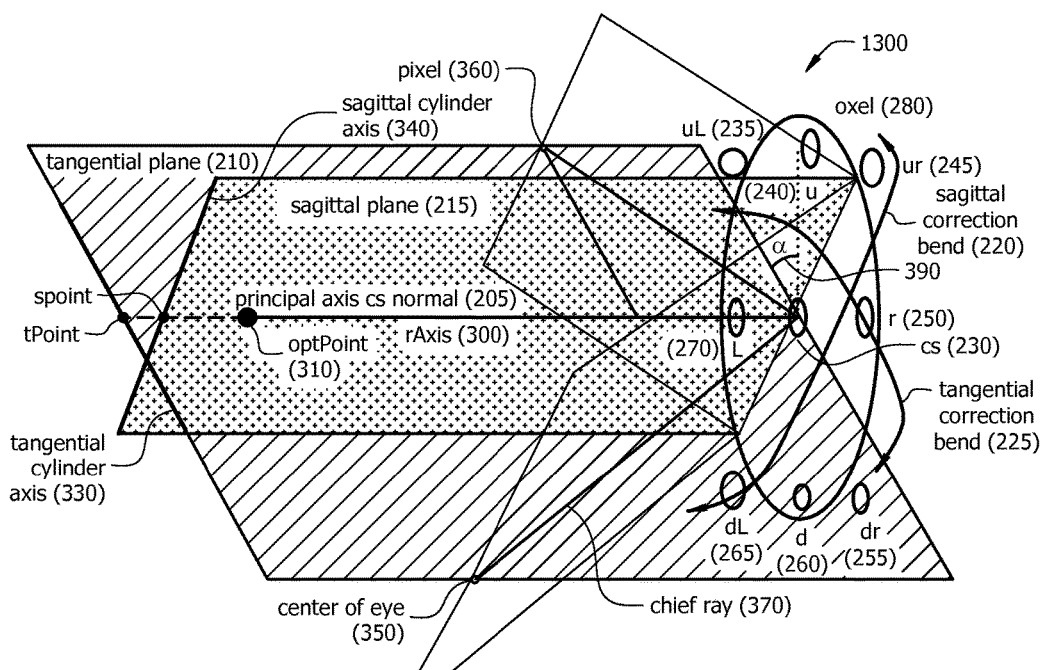
FIG. 13 shows individual astigmatism correction for a particular oxel.

FIG. 13 shows an example individual astigmatism correction for an oxel 280 including neighboring sub-surfaces 235, 240, 245, 250, 255, 260, 265, 270 and CS 230. The orientations for a tangential correction bend 225 and sagittal correction bend 220 are also depicted in FIG. 13. A pixel 360 is shown, with light from the pixel 360 reflecting off CS 230 to provide chief ray 370 which is shown reaching the center of the eye 350. CS 230 has a normal associated with it, this is shown in FIG. 13 along with a principle axis CS normal 205, and it also has an associated quaternion $q_n$ that is used to rotate a vector that points perpendicular to the oxel in body referenced coordinates (BRC), into a vector that points normal to the oxel in the reference orthonormal frame (ROF) in which the free-space wide field of view reflective optical surface is calculated. The BRC form of the oxel is used to calculate the adaptations due to the cylindrical bends since it simplifies the calculations by having the CS situated at x=0.0, y=0.0, and z=0.0 in the BRC system. The transformation from ROF to BRC is all based upon the oxel CS quaternion and the location of the center of the CS surface of the oxel. If the location in ROF of the cs center is represented as a pure quaternion $p_{cs}$, where $$p_{cs}.s=0,0$$
$$p_{cs}.x=cs.x\text{ROF}$$
$$p_{cs}.y=cs.y\text{ROF}$$
$$p_{cs}.z=cs.z\text{ROF}$$

with the dot notation meaning that $p_{cs}$ is a four-dimensional quantity, and in this case the s dimension is set to zero, and the quaternion that rotates a unit vector on the z direction in ROF to point to the same direction in ROF as the unit normal at the center of the CS, with the x and y directions aligned with the tangential and sagittal directions on the current oxel is described as the quaternion $q_n$, then the conversion of a point v referenced to the oxel CS in ROF into a point in BRC that can then be manipulated is shown as:

$$\hat{v} = v - p_{cs}$$

$$\check{v} = q_n^{-1} \hat{v} \, q_n$$

where the $(\bullet)^{-1}$ notation indicates the quaternion inverse, $\hat{v}$ indicates the location of v after it has been translated to be offset from the BRC origin at the center of the oxel CS, and $\check{v}$ indicates the resulting point after it has been rotated to be in the correct spot in BRC with respect to the CS origin.

Figure 14:
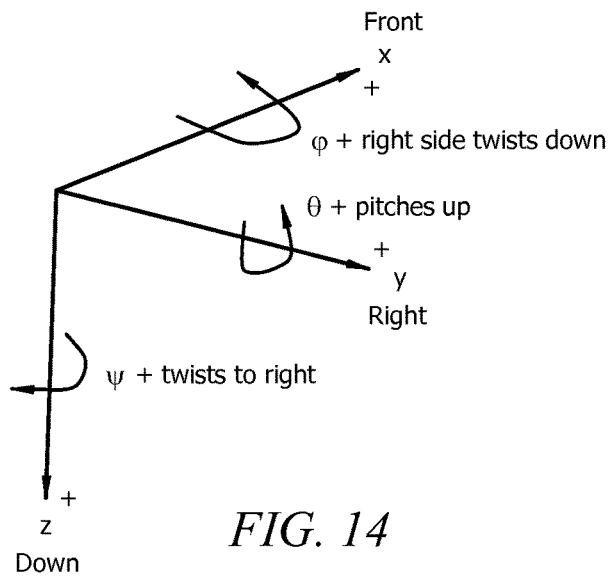
FIG. 14 depicts Body Referenced Coordinates (BRCs).

While there are multiple ways to define a coordinate system, the BRC coordinate system in this configuration is defined as shown in FIG. 14. This is a right-handed system that is amenable to rotations with quaternions. Other methods of calculating rotations may be used, and other coordinate systems may be used to accomplish the same results.

The optical system parameters that are used to calculate the individual astigmatism correction for a given oxel shown in FIG. 13 can include:

i) the oxel spherical radius of curvature, rAxis 300, calculated for focusing requirements;
ii) the oxel CS normal 205, specified for use in controlling reflections. This normal bisects the vector from CS 230 to the center (e.g., fovea) of the eye 350 and the pixel 360 and extends to Optpoint 310;
iii) the location of the pixel 360 or point on the external light-emitting object for which the particular oxel is designed to reflect. The pixel 360 may represent the center of a geographic region containing many pixels or object elements, and
iv) the location of the center of the eye 350.

These parameters are shown in FIG. 13 as part of an oxel alignment system 1300. Oxel alignment system 1300 can be used to discuss, envision, and calculate the astigmatism correction for oxels with oxel 280 shown. The center of the eye 350, CS 230 and the pixel 360 are three points that define a plane, shown as the tangential plane 210. In the simple ("gross") astigmatism correction disclosed above this was assumed to be aligned with the presumed vertical axis of the oxel 280, but in the more advanced form of astigmatism correction, the tangential plane 210 may be at an angle α 390 with respect to the presumed vertical axis of the oxel 280. Also, as the surface adapts to have the appropriate optical properties, the locations of the individual sub-surface elements may change, changing the presumed vertical axis, whereas the tangential plane will always be defined and operate physically as the plane defined by the center of the eye, the CS 230, and the pixel 360 no matter what angle it makes. To then apply the cylindrical corrections to the surface to correct astigmatism effects, the changes are made with respect to the tangential plane 210, and its associated sagittal plane 215 which is 90 degrees to the tangential plane 210.

The actual angle that the tangential plane makes as it slices through the CS 230 is used to establish the tangential cylinder axis 330 for calculating the cylindrical adjustments for the focusing of the sagittal waves, and the sagittal plane angle, which is 90 degrees orthogonal to the tangential plane 210 and also slices through the CS 230 is used to establish the sagittal cylinder axis 340 about which the tangential rays or waves are focused by bending the surface about that axis. The tangential cylinder axis 330 and the sagittal cylinder axis 340 will normally not be at the same location in order to apply different amounts of correction to bring the astigmatic difference together.

Figure 15:
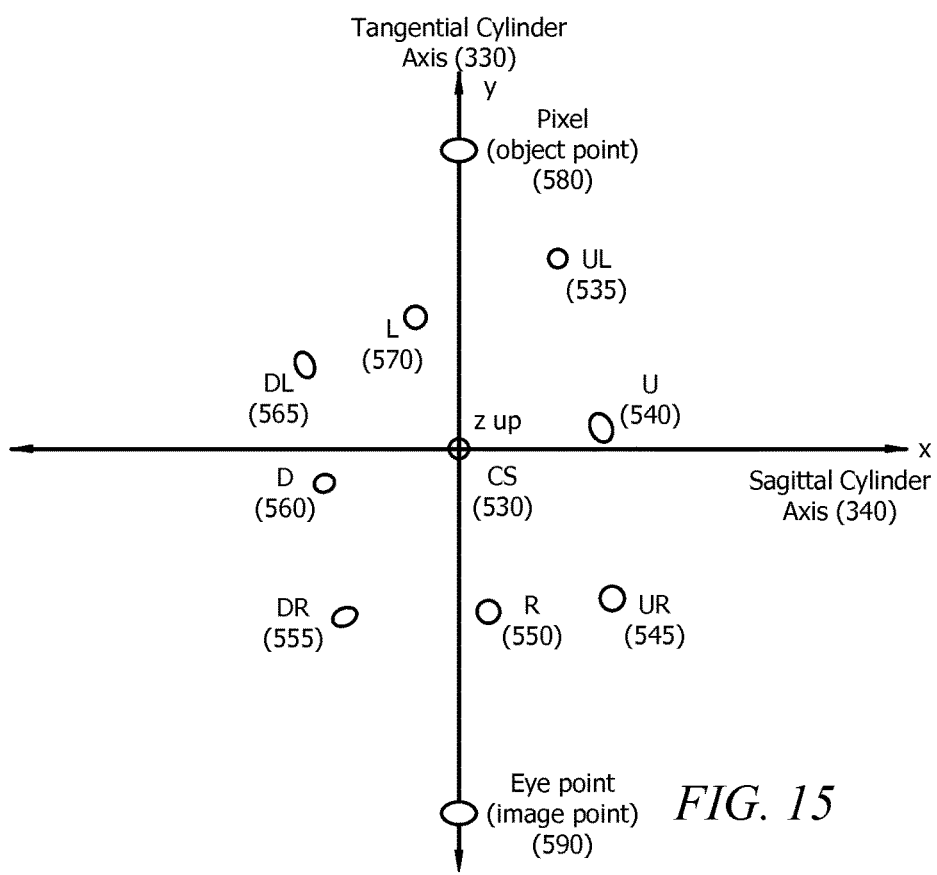
FIG. 15 shows a top view of the BRC version of oxel system.

Everything is rotated into Body Referenced Coordinates (BRCs), as shown in FIG. 15 which is top view of a BRC version of an oxel system, such that the tangential plane 330 defines the yz plane, the sagittal plane 340 defines the xz plane, and the height above the surface of the drawing becomes the z direction. With this simplification of the geometry it is more straightforward to apply the cylindrical corrections to each of the oxel sub-surface elements neighboring the CS sub-surface.

The up, or U sub-surface element 540 is now situated more toward the middle right of the rotated image. The renumbering (sub-surfaces 535, 540, 545, 550, 555, 560, 565, 570 and CS 530) shown helps to indicate that these points are now represented in the BRC system and CS 530 is at 0,0,0, with the other sub-surface elements relative to it, in the same relationship to each other that they were in the ROF system, except that the vertical, y axis is the tangential plane 330, the horizontal axis x is the sagittal plane 340, and the axis out of the page is the z axis and represents the vertical relationship of each of the neighboring sub-surface elements relative to the location of CS 530. The pixel (object point) is shown in FIG. 15 as pixel 580 and the eye point (image point) is shown as eye point 590.

Figure 16:
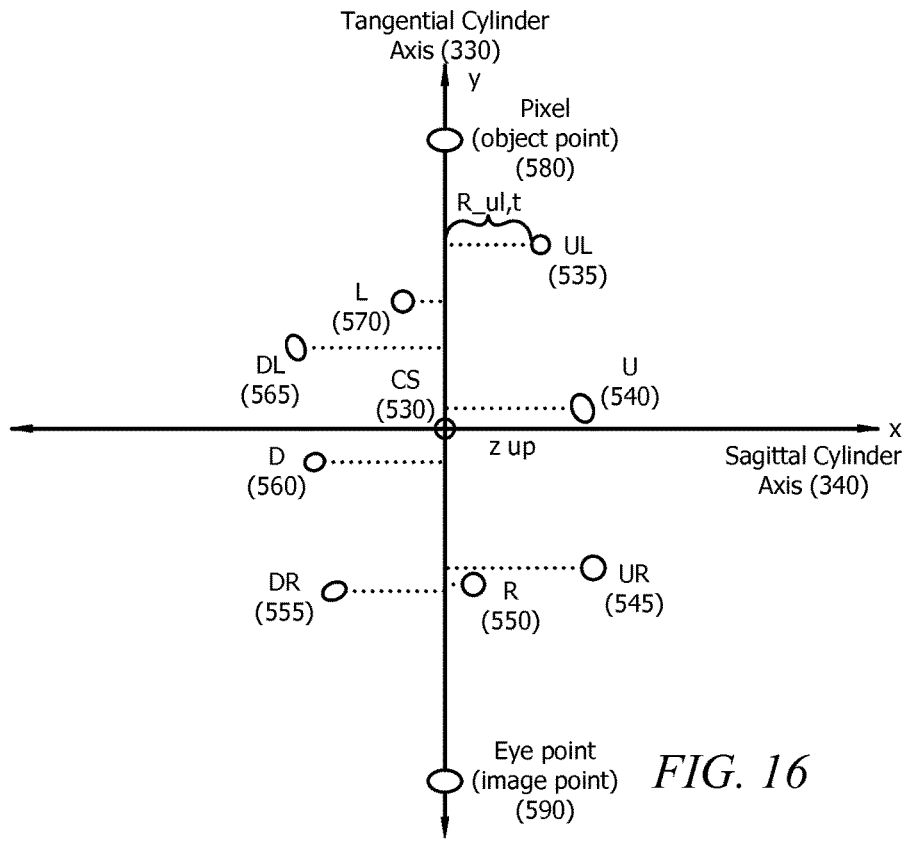
FIG. 16 is a view of sagittal wave correction with respect to the tangential cylindrical axis.
Figure 17:
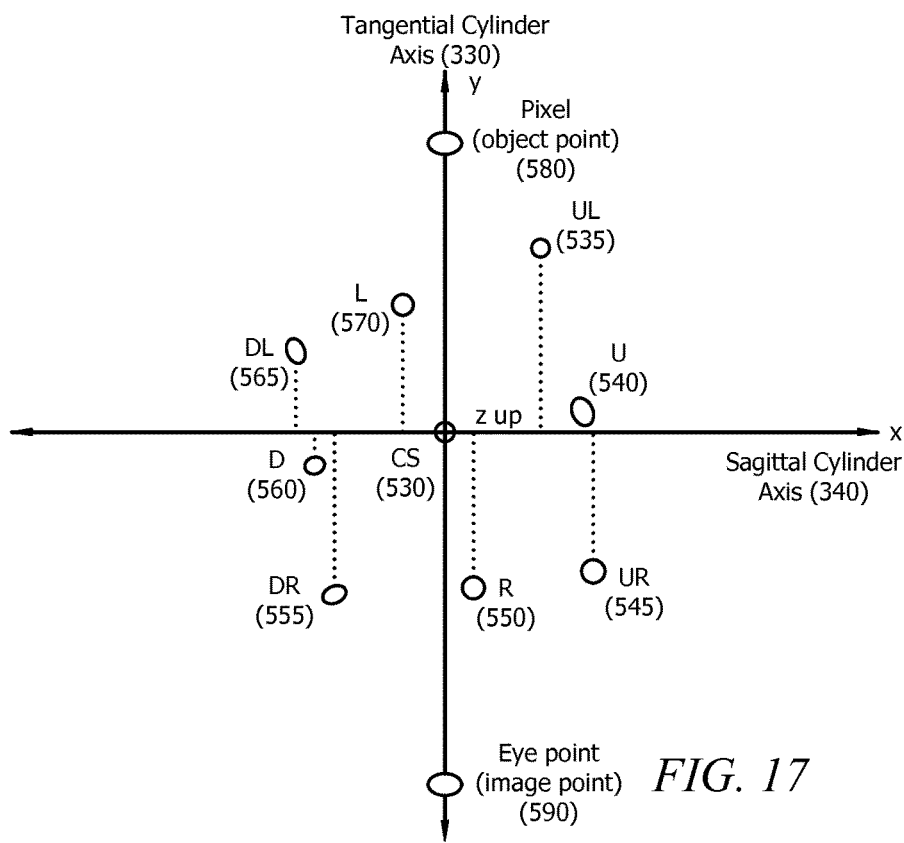
FIG. 17 is a depiction of tangential wave focus correction being calculated for each sub-surface element through cylindrical offsets based upon the distance from the sagittal cylindrical axis rotated into BRC, and the distance from the BRC xz plane.

When correcting for sagittal cylindrical curvature, the distance from the tangential axis 330 as shown in FIG. 16 can be used as the determining factor for how much to correct the position of each neighboring sub-surface element 535, 540, 545, 550, 555, 560, 565, 570 and CS 530. Similarly, as shown in FIG. 17, the distance from the sagittal axis 340 helps determine how much correction to apply to the sub-surface elements. The other primary determining factor is the amount of cylindrical correction, tangential or sagittal, positive or negative, to apply, and that is calculated based upon the angle that the eye (or other light receiver) makes to the CS 530 and the radius of curvature as described above.

Figure 18:
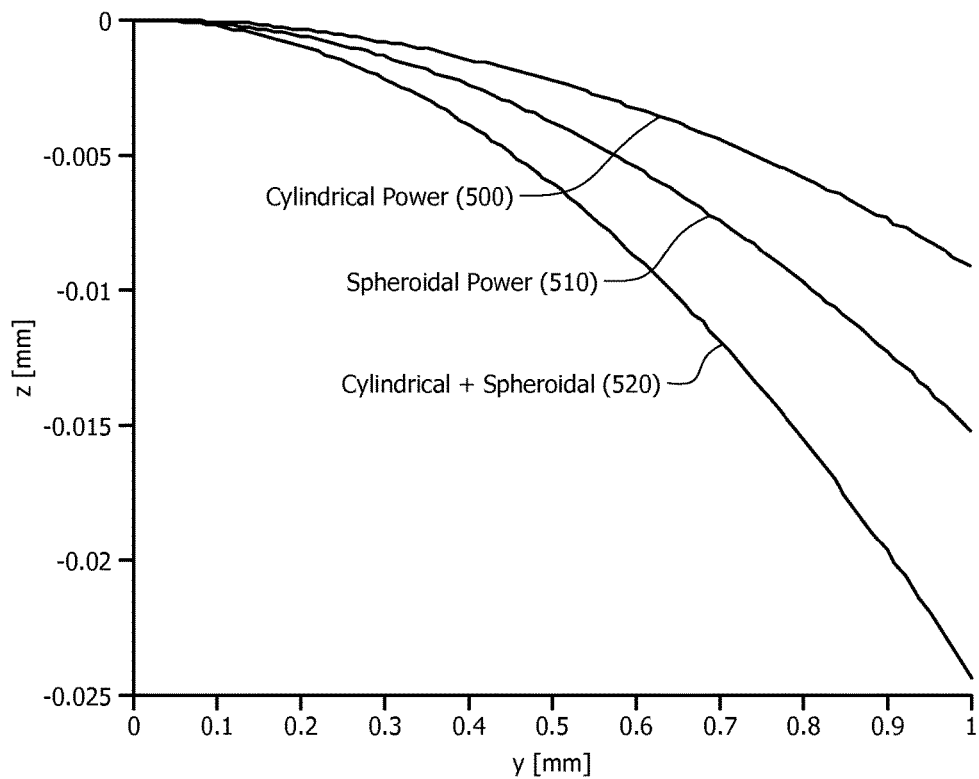
FIG. 18 shows the distance to an ideal surface from z=0 as a function of the distance out in the y direction, showing an ideal surface at the xz plane for an oxel considering only the desired spheroidality and tangential cylindrical power corrections, shown as the cylindrical power+spheriodal power.

The distance z (in mm) from the BRC xy plane is shown as a function of the distance out in the y direction (in mm) in FIG. 18, showing an ideal surface at the xz plane for this oxel considering only the desired spheroidality and tangential cylindrical power corrections. Curves are shown for cylindrical power correction 500, spheroidal power correction 510 and the combined spheroidal/cylindrical power correction 520. The addition of sagittal cylindrical correction will not change this curve at the xz plane but in consideration of sub-surfaces that are not on the xz plane, there will be correction due to sagittal cylindrical power correction and it too will be additive.

The correction for the oxel can be calculated based upon the locations of the optPoint 610 and the tPoint 600 shown in FIG. 19 described below. Since the oxel system has been rotated into BRC, the optPoint 610 and tpoint 600 lie on the normal axis to the CS 530 which is also the BRC z axis. Then the equation of a circle can be used to parametrically determine the height above the y axis in the z direction for the calculation on the yz plane.

Figure 19:
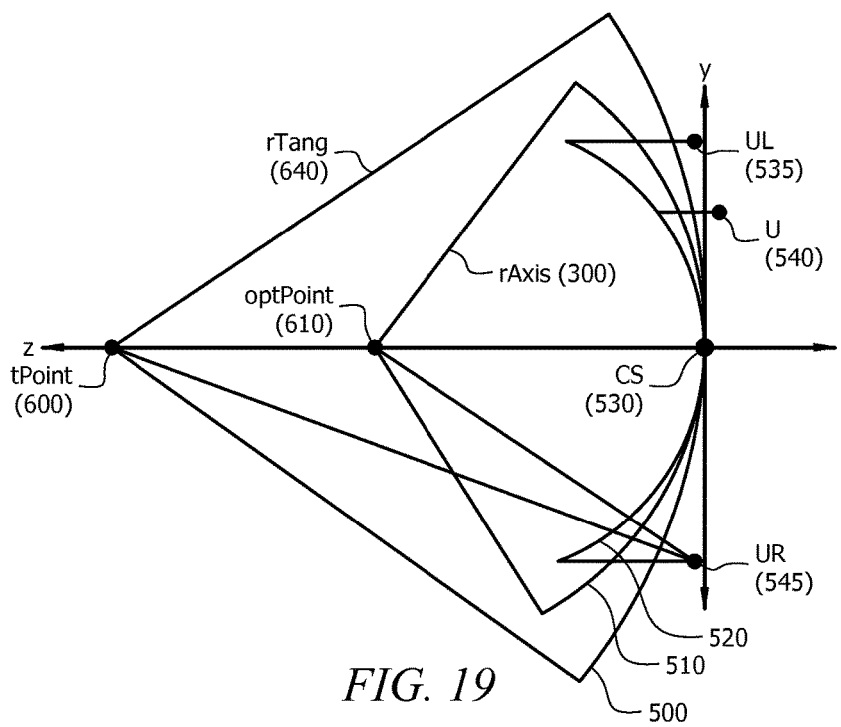
FIG. 19 shows an ideal surface being calculated based upon the optPoint for spheroidality and the tpoint that lies on the tangential cylindrical axis that determines the cylindrical correction up and down the x axis.

In this case the equation of the circle for the tangential cylindrical correction is:

$$rTang^2 = y_t^2 + z_t^2$$

where the t subscript denotes the tangential focus, and rTang 640 is the radius from the tangential cylindrical axis as shown in FIG. 19, calculated as $R_c$ earlier. This line describing the circle is shown as item 500 in FIG. 19 (see cylindrical 500 in FIG. 18).

The equation for the sphere crossing the yz plane is $$rAxis^2 = y_a^2 + z_a^2$$

with the a subscript denoting the axis term, which are based upon the calculated spheroidality power for this oxel. This line is shown as item 510 in FIG. 19 (see spheriodal power 510 in FIG. 18).

Choosing a surface point, such as the sub-surface element UR 545, and denoting it as point P, and choosing to change just the z axis location of point P, allows the y coordinate of point P, $y_p$ to remain unchanged. Other methods of adaptation can be used also such as adapting in the direction of optPoint and then in the direction of tpoint, but this method of just moving in the z direction will be shown to explain a method of adapting the oxel surface sub-elements to obtain the desired astigmatism correction. Thus $$y_a = y_p$$

and $$y_t = y_p$$

and the ideal y value for this sub-surface element of this oxel is:

$$y_i = y_p$$

With $y_p$ remaining unchanged in FIG. 19, the equation for the ideal surface, including both spheroidality and cylindricality changes for a positive power, positive diopter cylindrical change is then:

$$z_i = z_a + z_t$$
$$= \sqrt{rAxis^2 - y_p^2} + \sqrt{rTang^2 - y_p^2}$$

For a negative power, negative diopter cylindrical change the ideal z value for this sub-surface element is then $$z_i = z_a - z_t$$
$$= \sqrt{rAxis^2 - y_p^2} - \sqrt{rTang^2 - y_p^2}$$

These ideal values define a point in space that this sub-surface element needs to vector towards, and an error vector from the existing surface element point to the ideal point is determined, as:

$$y_s = 0$$

$$z_s = z_i - z_p$$

showing that the change in sub-surface element position is directed along the z axis, from the current z point $z_p$ to the ideal z point $z_i$. In three dimensions this also applies except the spheroidality calculations will be with respect to a single point and the cylindricality calculations will be with respect to a line axis.

As described above, the amount of cylindrical correction is based upon the angle that the eye or the pixel(s) makes from the CS normal as seen from the CS. The CS normal bisects the vector to the eye and the vector to the pixel from the CS, so that these angles will be the same (see FIG. 1). When adjusting the cylindrical power, the spherical power should generally be decreased by ½ the increase in cylindrical power to equalize the change in power. Power is generally measured in diopters.

Although the above-described method for performing astigmatism correction involves adjusting the oxel components through independent sagittal- and tangential-direction cylindrical changes (bending), the amount of sagittal- and tangential-direction change can also be calculated using a different system that replaces independent orthogonal sagittal and tangential adjustments with a formulaically-combined adjustment using a biconic 3D equation applied to each oxel on the surface. The biconic 3D equation is parameterized based on the desired radius in the tangential and in the sagittal directions. These are combined with the spherical power to obtain the total radius in each direction for the biconic equation. The biconic surface also is applied in the BRC space and rotated back into the ROF or eyespace to affect the actual surface. The values for the tangential and sagittal radius settings for the biconic equation for a given oxel may be obtained from a set of data that has been curve-fit, as in the dual cylindrical method. The data for the proper settings of the biconic may be obtained by conducting a survey of what biconic settings produce the best focus, measured as the spot size of a focus point in a simulated system, and conducting this for a set of data collected by varying the distance from the center of the oxel (CS) to the pixel, and the offset angle from the surface normal at CS to the pixel. As noted above, the offset angle to the pixel from the normal to CS has the same amount of angle as the offset angle from the surface normal to CS of the oxel to the rolling center—of the eye.

The biconic surface is similar to a toroidal surface except that the optical radius may be different in the x and the y directions. This allows for the use in providing different amounts of correction power in the tangential and in the sagittal directions in the optical system of the individual oxels. The equation for the biconic is:

$$z = \frac{c_x^2 x^2 + c_y^2 y^2}{1 + \sqrt{1 - (1 + k_x)c_x^2 x^2 - (1 + k_y)c_y^2 y^2}}$$

$$c_x = \frac{1}{R_x}, c_y = \frac{1}{R_y}$$

where $k_x$ and $k_y$ are zero for the spherical conic generally used herein. $R_x$ and $R_y$ are the radii in the tangential and sagittal directions, and z is the height above the x/y plane.

To use the biconic equation in 3D surface calculations, the geometry of the user's eye/the reflective optical surface/pixel for each oxel is determined, and the entire system can then be rotated into oxel space. This sets the x/y plane of the biconic calculation parallel and tangential to the surface normal of CS of the oxel. An idealized coordinate system is generally used that is centered about the oxel central location (CS), and the physically-determined tangential plane is used to set the x direction and the sagittal plane used for the y direction. The planes cross along the Raxis surface normal to the center of the oxel that includes the optpoint. All the points in eyespace that are critical in order for the adaptation to assume the biconic shape are rotated and translated into this oxel space.

The critical points in eyespace to translate into oxel space are all the neighboring sub-surfaces for an oxel. In the case of a 9-point oxel, such as oxel 501 in FIG. 5, all the eight neighboring sub-surfaces points (not including the CS) are the critical points to translate into the oxel space for adaptation. The CS is set to be at 0, 0, 0 in the BRC or oxel space. The adaptation change is determined and then the point changes are rotated and translated back into the eyespace, which is the pre-existing world coordinate system. The parameters for the biconic were calculated on an oxel-by-oxel basis depending on the angle between the eye and the pixel as seen from the oxel, and the distance of the oxel center to the pixel. A survey of useful biconic settings that can result in appropriate astigmatism relief for the instantaneous geometry is created and may be used in the ongoing adaptation.

After the corrections are determined in the oxel system in BRC, the oxel is re-rotated and translated back to its ROF location, and the next oxel is operated on in the same manner, and so on. The actual corrections are generally not applied until all the oxels have been analyzed, since most sub-surfaces belong to multiple oxels and each oxel will apply corrections that should be averaged together before application in order to adapt the 3D surface as a whole.

Figure 20:
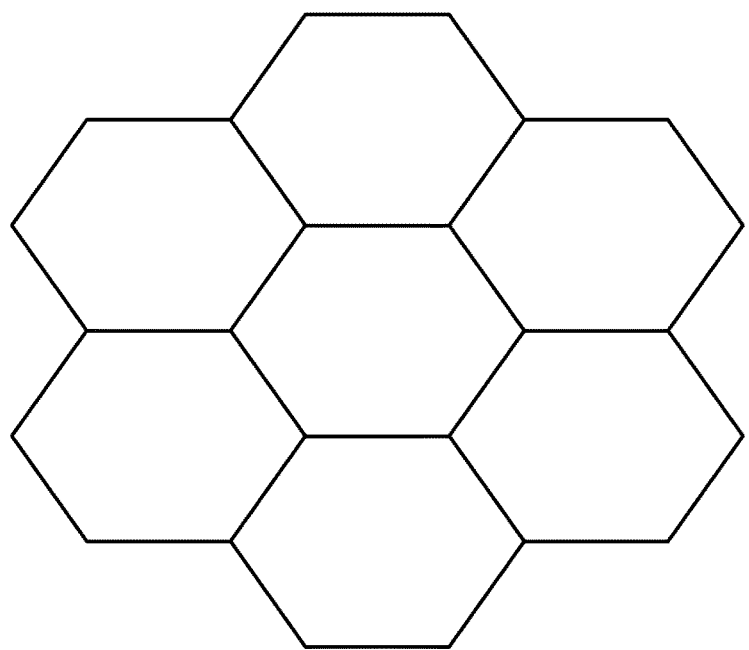
FIG. 20 shows oxels arranged in an example hexagonal pattern.

Oxels can be formed using different layouts of surface elements, such as in the example hexagonal pattern such as shown in FIG. 20, and disclosed methods of astigmatism correction remain applicable. Many alternative oxel patterns are possible (by way of non-limiting example, square).

There are a variety of methods to form (fabricate) disclosed astigmatism corrected surfaces. As described above, oxels are not physical objects, nor can they be seen or represented in a physical object as they are surface elements being points that define the location of the optical surface. The points are interconnected as a last step on the design to make a smooth surface through each surface element, such as using splines, and more so NURBS, for example.

Fabrication methods that can be used to create oxel-derived astigmatism corrected 3D surfaces for real-world applications (e.g., for astigmatism-corrected HMD displays that display the imagery from a light-emitting display device held in close proximity to a HMD user's eye) include 3D printing of a computer aided design (CAD) model containing the designed discretized mathematical surface comprising a plurality of elements spread over the area of the lens. Other available methods for forming disclosed astigmatism corrected surfaces include Single Point Diamond Turning (SPDT) machining of materials such as polycarbonate or aluminum, and through plastic mold technology including hot embossing of polycarbonate. Single-point diamond turning involves a computer-controlled lathe and a diamond tip to directly cut the desired profile into a piece of glass or another optical material. For immersive disclosed embodiments (non-see-through), such as immersive HMD technologies, the material can comprise aluminum. Regarding processing methods, laser ablation may also be possible.

Figure 21:
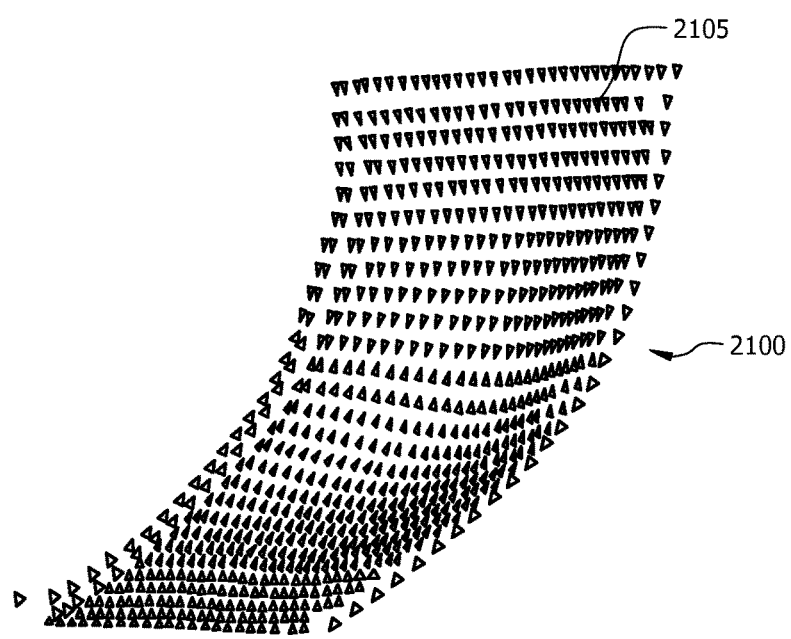
FIG. 21 depicts an example lens having a reflective 3D surface created using the oxel method having a plurality of reflective optical elements.

FIG. 21 depicts an example astigmatism corrected lens 2100 having a reflective 3D surface created using the oxel method having a plurality of reflective optical elements 2105. The surface depicted has not yet been splined (and thus the surface smoothed) and shows the reflective optical elements 2105 as individual elements as calculated. Values of cylindrical axis orientations includes both sagittal direction and tangential direction that are generally different between reflective optical elements 2105, with at least one neighboring reflective optical element to each reflective optical element having at least one neighboring reflective optical elements with different values of cylindrical axis orientation including different orientations in both the sagittal direction and tangential direction. Moreover, the different values of cylindrical axis orientation generally change monotonically from side-to-side in both in plane-directions.

As can be seen in FIG. 21, the configuration of the disclosed reflective 3D surface of the astigmatism corrected lens 2100 is complex and bears little resemblance to the spherical or aspherical surfaces created by other optical design techniques. As noted above, although not shown in FIG. 21, the individual surface elements 2105 are generally splined together to create a smooth continuous surface, so a large number (by way of non-limiting example, thousands) of reflective optical elements 2105 may fabricated on a common material with a 3D surface that is smooth at a fine grain level.

Figure 22A:
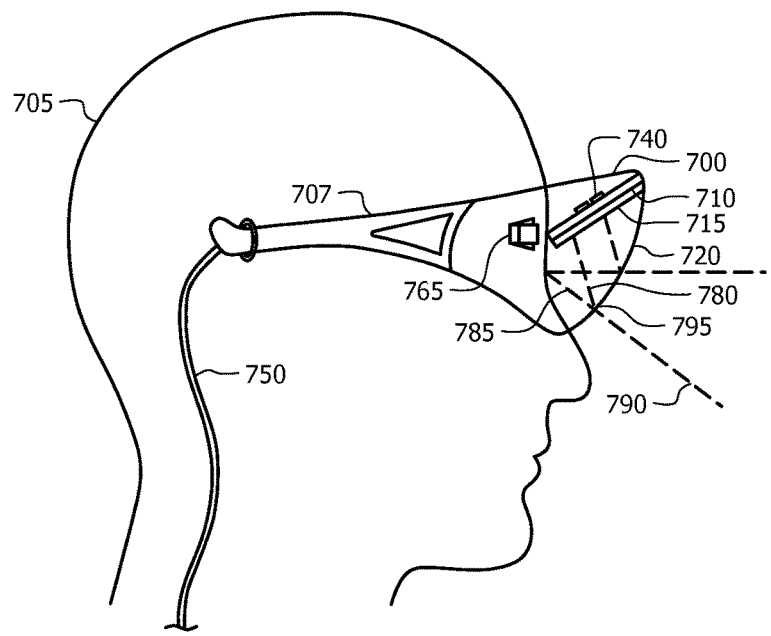
FIG. 22A is a side view representation of an example head-mounted display (HMD) apparatus including a disclosed reflective 3D surface including a plurality of reflective optical elements each having their own non-overlapping optical center axis; and a cylindrically bent spherical surface, according to an example embodiment.

FIG. 22A is a side view representation of an example HMD display apparatus 700 including a disclosed astigmatism corrected lens, according to an example embodiment. Although described applied to HMDs, disclosed embodiments are not limited to HMDs, and can be used for other wide FOV reflectors or optical systems, such as for a periscope in one particular embodiment.

The HMD can be an optical see-through HMD or a video see-through (immersion) HMD. In the case of optical see-through, the astigmatism corrected lens can comprise a meniscus lens which is a thin lens having the same front and rear surface curvature so that the lens does not bend outside (real) world light. Alternatively, the HMD can be completely immersive, where the user sees only a virtual reality.

Figure 22B:
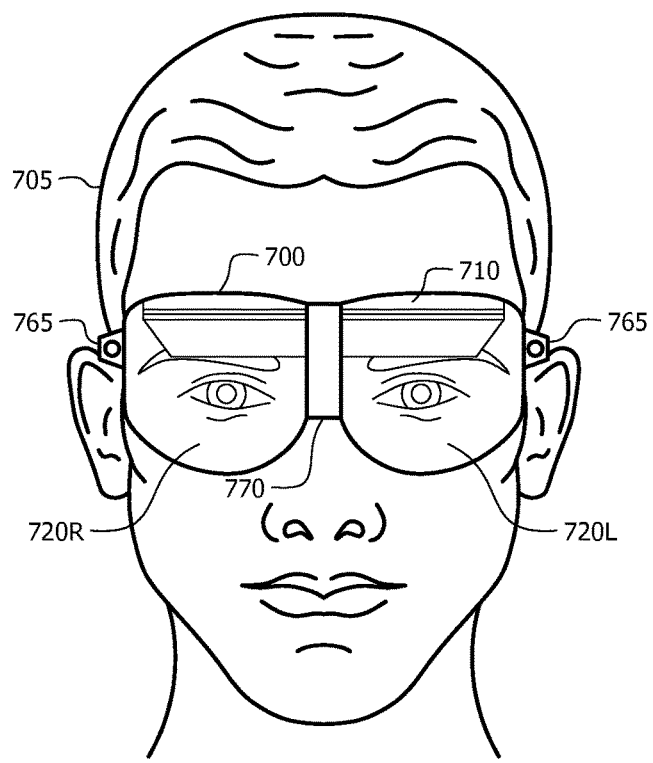
FIG. 22B is a front view representation of the example head-mounted display apparatus shown in FIG. 22A.

FIG. 22B is a front view representation of the example HMD of FIG. 22A. As shown in FIGS. 22A and 22B, the HMD 700 includes a frame 707 adapted to be worn on the head 705 of a user and supported by the user's nose and ears in a manner similar to that in which eyeglasses are worn. In the embodiment of FIGS. 22A and 22B, as well as in the other embodiments disclosed herein, the HMD may have a variety of configurations and can, for example, resemble conventional goggles, glasses, helmets, and the like. In some embodiments, a strap may be used to hold the HMD's frame in a fixed position with respect to the eyes of the user. In general terms, the outside surface of the HMD package can assume any form that holds the optical system in the required orientation with respect to the HMD's display(s) and the user's eyes.

The HMD 700 includes at least one image display system 710 and at least one optical system that includes a reflective optical surface which, as shown in FIGS. 22A and 22B is a free space, ultra-wide angle, reflective 3D surface 720, which by necessity is curved. In some embodiments, the reflective 3D surface 720 can be the entire optical system. The reflective 3D surface 720 can be purely reflective or can have both reflective and transmissive properties, in which case, it can be thought of as a type of "beam splitter."

The reflective 3D surface 720 may completely surround one or both eyes, as well as the at least one image display system 710. In particular, the reflective 3D surface 720 can curve around the sides of the eyes and toward the sides of the face so as to expand the available horizontal FOV. In one embodiment, the reflective 3D surface 720 may extend up to 150° or more (e.g., more than 200°). As illustrated in FIG. 22B, the HMD 700 may include two separate reflective optical surface 720R and 720L for the user's two eyes which are separately supported by the frame and/or a nasal ridge piece 770 (see below). Alternately, the HMD 700 may employ a single reflective 3D surface 720 that serves both eyes with a single structure, some portions of which are viewed by both eyes and other portions of which are viewed by only one eye.

As noted immediately above and as illustrated in FIG. 22B, the HMD apparatus 700 can include a nasal ridge piece 770. The nasal ridge piece 770 can be a vertical bar or wall which provides a separation between two reflective 3D surface 720L and 720R surfaces, one for each of the user's eye. The nasal ridge piece 770 can also provide a separation between the fields of view of the user's two eyes. In this way, the user's right eye can be shown a first representation of three dimensional physical reality in the environment by displaying a first image to the right eye via a first image display device and a first reflective 3D surface 720R surface, while the user's left eye is shown a second representation of three dimensional physical reality in the environment by displaying a second image to the left eye via a second image display device and a second reflective 3D surface 720L.

A separate display device/reflective surface combination thus services each eye of the user, with each eye seeing the correct image for its location relative to the three dimensional physical reality in the environment. By separating the user's two eyes, the ridge piece 770 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right.

The at least one image display system 710 can be mounted inside the reflective 3D surface 720 and may be horizontally disposed or at a slight angle with respect to the horizon. Alternatively, the at least one image display system can be located just outside of the reflective 3D surface 720. The tilt or angle of the at least one image display system 710 or, more particularly, its at least one light-emitting surface, will in general be a function of the location of the pixels, images, and/or pieces of display information that are to be reflected from the reflective 3D surface 720.

In certain embodiments, the HMD apparatus 700 is configured to create an interior cavity, with the reflective 3D surface 720 being reflective inward into the cavity. For a reflective 3D surface 720 having transmissive properties, the image or display information from the at least one image display system is reflected into the cavity and to the user's eye from the surface while, simultaneously, light also enters the cavity and the user's eye from the external world by passing through the partially-reflective surface.

In certain embodiments, the at least one image display system 710 provides images and/or pieces of display information that prior to entering the user's eye(s) are adjusted for near viewing. In some embodiments, an optional lens or lens system 715 may contribute to this adjusting. One or more Fresnel lenses can be used for this purpose. Other embodiments do not utilize the optional lens or lens system, and instead rely on the reflective 3D surface 720 to provide desired optical properties for in-focus, near-to-the-eye viewing of the images formed by the display system.

The HMD apparatus 700 can include an electronics package 740 to control the images that are displayed by the at least one image display system 710. In one embodiment, the electronics package 740 includes accelerometers and gyroscopes that provide location, orientation and position information needed to synchronize images from the at least one image display projection system 710 with user activities. Power and video to and from the head-mounted display apparatus 700 can be provided through a transmission cable 750 coupled to the electronics package 740 or through a wireless medium.

A set of cameras 765 may be situated on opposite sides of the HMD apparatus 700 to provide input to the electronics package to help control the computer generation of, for example, "augmented reality" scenes. The set of cameras 765 may be coupled to the electronics package 740 to receive power and control signals and to provide video input to the electronics package's software.

The image display system 710 used in the HMD apparatus 700 can take many forms, now known or subsequently developed. For example, the system can employ small high resolution liquid crystal displays (LCDs), light emitting diode (LED) displays, and/or organic light emitting diode (OLED) displays, including flexible OLED screens. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the reflective 3D surface 720 is polarized orthogonally to the light emitted from the display, then light will not leak out of the reflective 3D surface 720. The information displayed and the light source itself will accordingly not be visible outside of the HMD 700.

Overall operation of an example embodiment of an optical system, specifically, an optical system for an "augmented reality" HMD, is illustrated by the ray-tracings of FIG. 22A, specifically, light rays 780, 785, and 790. In this embodiment, reflective optical surface 720 has both reflective and transmissive properties. Using reflective optical surface's 720 transmissive properties, light ray 790 enters from the environment through the surface and proceeds towards the user's eye. From the same region of reflective 3D surface 720, light ray 780 is reflected by the surface (using the surface's reflective properties) and joins light ray 790 to create combined light ray 785 that enters the user's eye when the user looks in the direction of point 795, i.e., when the user's direction of gaze is in the direction of point 795. While so looking, the user's peripheral vision capabilities allow the user to see light from other points in the environment which pass through reflective 3D surface 720, again using the surface's transmissive properties.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents. For example, disclosed embodiments may also be applied to refractive optics including general corrective lenses by providing disclosed oxel-based optical correction to refractive optics. Moreover, there are applications for astigmatism corrected reflective (or partially reflective) optical surface beyond the display for HMDs, including to focus space telescopes, to focus sunlight on laser rods to ignite fuel, to focus light into different areas, not just to a single point at the center of the eye, to adapt automobile windshields for improved heads-up displays, to provide improved face minors that have a wider field of view, to improve binocular optics, for reflection of electromagnetic waves through dielectric minor and lens adaptation, to focus audio waves for crowd control, focus microwaves for a weapon, for audio room design.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

The invention claimed is:

1. A lens, comprising:
   a material spanning an area providing a single inside reflective three-dimensional (3D) surface;
   wherein said area of said reflective 3D surface is defined by a plurality of reflective optical segments including a first reflective optical segment and at least a second reflective optical segment that each include a sub-element set including a center sub-element (CS) and a plurality of neighboring sub-elements;
   said plurality of reflective optical segments each having their own non-overlapping optical center axis and a cylindrically bent spherical surface;
   wherein said cylindrically bent spherical surface is defined by said plurality of neighboring sub-elements in each of said plurality of reflective optical segments being located at different 3D points so that said plurality of reflective optical segments relative to at least one neighboring one of said plurality of reflective optical segments provide different values of spherical curvature and different values of cylindrical axis orientation, and
   wherein each of said plurality of reflective optical segments provide a different optical power for correction of astigmatism.

2. The lens of claim 1, wherein said different values of cylindrical axis orientation includes different orientation in both a sagittal direction and in a tangential direction.

3. The lens of claim 2, wherein said different values of cylindrical axis orientation change monotonically from side-to-side in both in-plane directions.

4. The lens of claim 1, wherein said reflective 3D surface provides a field of view to a nominal user of at least 150°.

5. The lens of claim 1, wherein said lens comprises a beam splitter and said material is partially transmissive to visible light.

6. The lens of claim 5, wherein said lens comprises a meniscus lens.

7. A method, comprising:
   defining a material spanning an area;
   defining a plurality of oxels across said area each having an initial inside spherical reflective surface and a sub-element set including a center sub-element (CS) and a plurality of neighboring sub-elements;
   for each of said plurality of oxels based on a distance to a pixel to be aligned thereto and an angle to said pixel from a normal to said CS, individually determining an amount of cylindrical curvature including values of cylindrical axis orientation to cylindrically bend said inside spherical reflective surface to focus sagittal beams and tangential beams at a predetermined common point,
   after said individually determining, data smoothing said plurality of oxels, and
   said data smoothing, fabrication using said material to form a plurality of reflective optical segments from each of said plurality of oxels that collectively provide a single inside reflective 3D surface of a lens.

8. The method of claim 7, wherein said individually determining comprises independently determining values of said cylindrical axis orientation including both sagittal- and tangential-orientations.

9. The method of claim 8, wherein said individually determining comprises:
   determining an angle of a tangential plane and sagittal plane with respect to said CS;
   and calculating diopter corrections, comprising:
   using a location of neighboring sub-surfaces to said CS to calculate an affect that an angled cylindrical bend will have, wherein an amount of angled cylindrical bending is indicated by an angle that an associated said pixel makes with a light receiver at said predetermined common point upon reflection from each of said plurality of oxels and a radius-of-curvature of each of said plurality of oxels;
   tabulating said affect said angled cylindrical bend will have and said radius-of-curvature with respect to performance with a mirror-based system;
   interpolating to calculate said cylindrical curvature comprising an amount of sagittal and/or tangential diopter correction applied to said oxel, and
   repeating said determining said angle and calculating diopter corrections for all others of said plurality of oxels.

10. The method of claim 7, wherein said individually determining comprises using a formulaically-combined sagittal/tangential-direction adjustment using a biconic 3-dimensional equation applied to each of said plurality of oxels, wherein said biconic 3-dimensional equation is parameterized based on a distance from said CS to said pixel, and by an offset angle from a surface normal at said CS to said pixel.

11. A head mounted display (HMD), comprising:
   glasses securing an image display system having a plurality of pixels which emit light representing virtual objects from virtual object data received from a computing system;
   a lens including a material spanning an area providing a single inside reflective three-dimensional (3D) surface, wherein said reflective 3D surface is optically aligned to receive said light at a non-normal angle of incidence and reflect said light toward eyes of a user of said HMD,
   wherein said area of said reflective 3D surface is defined by a plurality of reflective optical segments including a first reflective optical segment and at least a second reflective optical segment that each include a sub-element set including a center sub-element (CS) and a plurality of neighboring sub-elements;
   said plurality of reflective optical segments each having their own non-overlapping optical center axis; and a cylindrically bent spherical surface;
   wherein said cylindrically bent spherical surface is defined by said plurality of neighboring sub-elements in each of said plurality of reflective optical segments being located at different 3D points,
   wherein said cylindrically bent spherical surface for each of said plurality of reflective optical segments is based on a distance to a first pixel to be aligned thereto from said plurality of pixels and an angle to said first pixel from a normal to said CS, wherein an amount of cylindrical curvature including values of cylindrical axis orientation for said cylindrically bent spherical surface provides astigmatism correction across said area by focusing sagittal beams and tangential beams of said light at said eyes.

12. The HMD of claim 11, wherein each of said plurality of reflective optical segments provide a different optical power for correction of astigmatism.

13. The HMD of claim 11, wherein said lens comprises a curved beam splitter, said curved beam splitter transmitting incident external-world objects to said eyes of said user.

14. The HMD of claim 13, wherein said lens comprises a meniscus lens.

15. The HMD of claim 11, wherein said lens is not optically transparent, wherein said HMD is a video-see-through HMD.

16. The HMD of claim 11, wherein said HMD is completely immersive.

17. The HMD of claim 11, wherein said values of cylindrical axis orientation for each of said plurality of reflective optical segments are such that said plurality of reflective optical segments have different values of said cylindrical axis orientation includes both different orientation in a sagittal direction and in a tangential direction relative to at least one neighboring one of said plurality of reflective optical segments.

18. The HMD of claim 17, wherein said values of cylindrical axis orientation changes monotonically from side-to-side in both in plane-directions.

19. The HMD of claim 17, wherein said reflective 3D surface provides a field of view to a nominal user of at least 150°.

* * * * *